US012002394B2

(12) United States Patent
Shin et al.

(10) Patent No.: US 12,002,394 B2
(45) Date of Patent: Jun. 4, 2024

(54) DISPLAY SYSTEM AND METHOD OF COMPENSATING IMAGE OF DISPLAY PANEL USING THE SAME

(71) Applicant: Samsung Display Co., Ltd., Yongin-Si (KR)

(72) Inventors: Yong-Jin Shin, Asan-si (KR); Kyunho Kim, Yongin-si (KR); Dongin Kim, Suwon-si (KR); Hyoung-Wook Kim, Hwaseong-si (KR); Bongim Park, Hwaseong-si (KR); Soohoon Lee, Hanam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/399,438

(22) Filed: Aug. 11, 2021

(65) Prior Publication Data

US 2022/0051600 A1 Feb. 17, 2022

(30) Foreign Application Priority Data

Aug. 12, 2020 (KR) ........................ 10-2020-0101342

(51) Int. Cl.
*G09G 3/30* (2006.01)
*G09G 3/20* (2006.01)
*G09G 3/36* (2006.01)

(52) U.S. Cl.
CPC ......... *G09G 3/20* (2013.01); *G09G 2320/103* (2013.01); *G09G 2360/16* (2013.01); *G09G 2370/08* (2013.01)

(58) Field of Classification Search
CPC ............... G09G 3/20; G09G 2320/103; G09G 2360/16; G09G 2370/08
See application file for complete search history.

(56) References Cited

U.S. PATENT DOCUMENTS

| | | | | |
|---|---|---|---|---|
| 2005/0057486 A1* | 3/2005 | Aoki | H04N 9/3155 348/790 |
| 2008/0191985 A1* | 8/2008 | Katayama | G09G 3/006 345/89 |
| 2012/0038688 A1* | 2/2012 | Deyama | G09G 5/02 345/690 |
| 2016/0117998 A1* | 4/2016 | Matsui | G09G 3/3406 315/151 |
| 2017/0193920 A1 | 7/2017 | Kim | |
| 2018/0286298 A1* | 10/2018 | Levin | G09G 3/20 |

FOREIGN PATENT DOCUMENTS

| | | |
|---|---|---|
| KR | 100579883 B1 | 5/2006 |
| KR | 1020170079998 A | 7/2017 |

* cited by examiner

*Primary Examiner* — Sanghyuk Park
(74) *Attorney, Agent, or Firm* — CANTOR COLBURN LLP

(57) ABSTRACT

A display system includes a measurer, a measured data filter and a compensation data generator. The measurer measures an image at a measuring point of a display panel to generate measured data. The measured data filter removes a false measured data outside an allowable range among the measured data. The compensation data generator generates representative compensation data compensating the image based on the measured data in which the false measured data is removed.

18 Claims, 8 Drawing Sheets

DISPLAY SYSTEM AND METHOD OF COMPENSATING IMAGE OF DISPLAY PANEL USING THE SAME

This application claims priority to Korean Patent Application No. 10-2020-0101342, filed on Aug. 12, 2020, and all the benefits accruing therefrom under 35 U.S.C. § 119, the content of which in its entirety is herein incorporated by reference.

BACKGROUND

1. Field

Embodiments of the invention relate to a display system and a method of compensating an image of a display panel using the display system. More particularly, embodiments of the invention relate to a display system for filtering a false measured data of a measuring part to increase an accuracy of measured data to increase an accuracy of image compensation and a method of compensating an image of a display panel using the display system.

2. Description of the Related Art

Generally, a display apparatus includes a display panel and a display panel driver. The display panel may include a plurality of gate lines and a plurality of data lines. The display panel driver may include a gate driver and a data driver. The gate driver may output gate signals to the gate lines. The data driver may output data voltages to the data lines.

The display may have optical characteristics such as a non-uniform luminance and non-uniform chromaticity according to process variation. To compensate the non-uniform luminance and the non-uniform chromaticity, the image of the display panel may be measured using a measurer and compensation data may be generated using the measured data.

SUMMARY

In an display system, where an image of a display panel is measured using a measurer and compensation data is generated using the measured data to compensate non-uniform luminance and non-uniform chromaticity, an error occurs in the compensation data due to an error that may occur in the measured data measured by the measurer, such that the image of the display panel may not be accurately compensated.

Embodiments of the invention provide a display system for filtering a false measured data of a measurer to increase an accuracy of measured data to increase an accuracy of image compensation.

Embodiments of the invention also provide a method of compensating an image of a display panel using the display system.

In an embodiment of a display system according to the invention, the display system includes a measurer which measures an image at a measuring point of a display panel to generate measured data, a measured data filter which removes a false measured data exceeding an allowable range among the measured data, and a compensation data generator which generates representative compensation data compensating the image based on the measured data in which the false measured data is removed.

In an embodiment, the display system may further include an interpolator which interpolates the representative compensation data corresponding to the measuring point of the display panel to generate an interpolation compensation data.

In an embodiment, the display system may further include an extrapolator which generates an extrapolation compensation data corresponding to a display area outside an outermost measuring point based on an outermost representative compensation data corresponding to the outermost measuring point.

In an embodiment, the display system may further include a data outputter which compensates input image data based on the representative compensation data, the interpolation compensation data and the extrapolation compensation data to generate a data signal.

In an embodiment, the display system may further include a driving controller which generates the data signal based on the input image data, a gate driver which outputs a gate signal to a gate line of the display panel and a data driver which outputs a data voltage to a data line of the display panel based on the data signal. In such an embodiment, the driving controller may include the interpolator, the extrapolator and the data outputter.

In an embodiment, the display system may further include a driving controller which generates the data signal based on the input image data, a gate driver which outputs a gate signal to a gate line of the display panel and a data driver which outputs a data voltage to a data line of the display panel based on the data signal. In such an embodiment, the driving controller may include the measured data filter, the compensation data generator, the interpolator, the extrapolator and the data outputter.

In an embodiment, the measured data filter may remove a data outside a first allowable range among first data measured multiple times by a first unit measurer of the measurer.

In an embodiment, when an average of the first data is denoted by m1, a first standard deviation of the first data is denoted by σ1, a predetermined first tolerance coefficient is denoted by t1 and the first data is denoted by x, the first allowable range of the first data may correspond to the following inequality: $m1-t1*\sigma1<x<m1+t1*\sigma1$.

In an embodiment, the measured data filter may be which remove a data outside a second allowable range among second data measured at adjacent measuring points in a measuring point group of the measurer and to replace the removed data with replacement data.

In an embodiment, when an average of the second data is denoted by m2, a second standard deviation of the second data is denoted by σ2, a predetermined second tolerance coefficient is denoted by t2 and the second data is denoted by y, the second allowable range of the second data may correspond to the following inequality: $m2-t2*\sigma2<y<m2+t2*\sigma2$.

In an embodiment, the replacement data may be the average of the second data.

In an embodiment, the replacement data may be an average of values of the second data in the second allowable range.

In an embodiment, a size of the measuring point group in an edge portion of the display panel may be smaller than a size of the measuring point group in a central portion of the display panel.

In an embodiment, a size of the measuring point group in a corner portion of the display panel may be smaller than the size of the measuring point group in the edge portion of the display panel.

In an embodiment, the measured data filter may include a single measurer filter which removes a data outside a first allowable range among first data measured multiple times by a first unit measurer of the measurer and a multi measuring point filter which replaces data outside a second allowable range among second data measured at adjacent measuring points in a measuring point group of the measurer with replacement data.

In an embodiment, when an average of the first data is denoted by m1, a first standard deviation of the first data is denoted by $\sigma 1$, a predetermined first tolerance coefficient is denoted by t1 and the first data is denoted by x, the first allowable range of the first data may correspond to the following inequality $m1-t1*\sigma 1<x<m1+t1*\sigma 1$. In such an embodiment, when a second average of the second data is denoted by m2, a second standard deviation of the second data is denoted by $\sigma 2$, a predetermined second tolerance coefficient is denoted by t2 and the second data is denoted by y, the second allowable range of the second data may correspond to the following inequality $m2-t2*\sigma 2<y<m2+t2*\sigma 2$.

In an embodiment, the first tolerance coefficient may be less than the second tolerance coefficient.

In an embodiment of a method of compensating an image of a display panel according to the invention, the method includes measuring an image at a measuring point of a display panel to generate measured data, removing a false measured data outside an allowable range among the measured data, generating representative compensation data compensating the image based on the measured data which the false measured data is removed, interpolating the representative compensation data corresponding to the measuring point of the display panel to generate an interpolation compensation data, and generating an extrapolation compensation data corresponding to a display area outside an outermost measuring point based on an outermost representative compensation data corresponding to the outermost measuring point.

In an embodiment, the removing the false measured data may include removing a data outside a first allowable range among first data measured multiple times by a first unit measurer.

In an embodiment, the removing the false measured data may include removing a data outside a second allowable range among second data measured at adjacent measuring points in a measuring point group of a measurer, and replacing the removed data with replacement data.

According to embodiments of the display system and the method of compensating the image of the display panel using the display system, the data outside the first allowable range among data measured multiple times with a single unit measurer may be filtered so that the accuracy of the measured data may be enhanced and the accuracy of the image compensation may be enhanced.

In such embodiments, the data outside the second allowable range among data of multiple adjacent measuring points may be replaced with the replacement data so that the accuracy of the measured data may be enhanced and the accuracy of the image compensation may be enhanced.

In such embodiments, the uniformity of the optical characteristic of the display panel may be enhanced so that the display quality of the display panel may be enhanced.

BRIEF DESCRIPTION OF THE DRAWINGS

The above and other features of the invention will become more apparent by describing in detailed embodiments thereof with reference to the accompanying drawings, in which.

DETAILED DESCRIPTION

Figure 1:
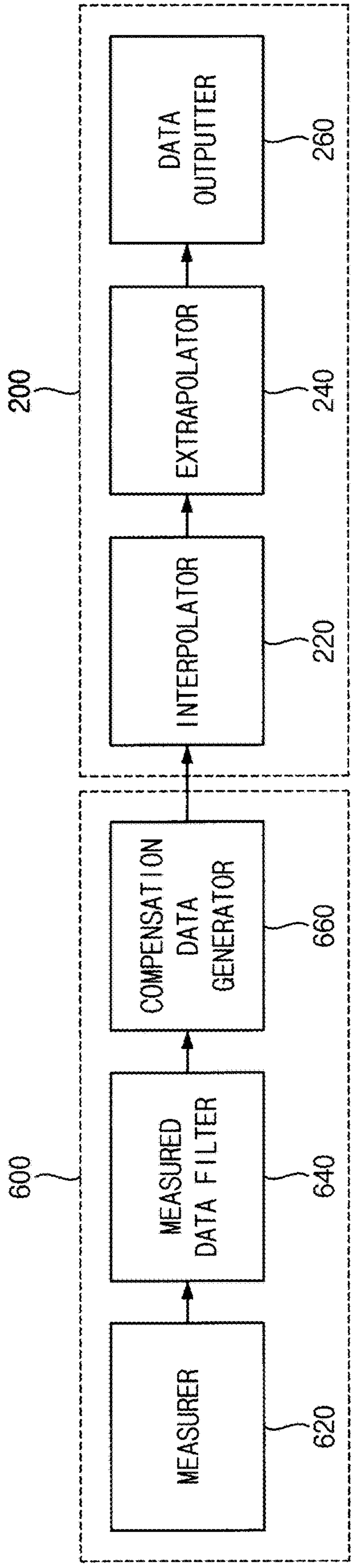
FIG. 1 is a block diagram illustrating a display system according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be described in detail with reference to the accompanying drawings.

Figure 2:
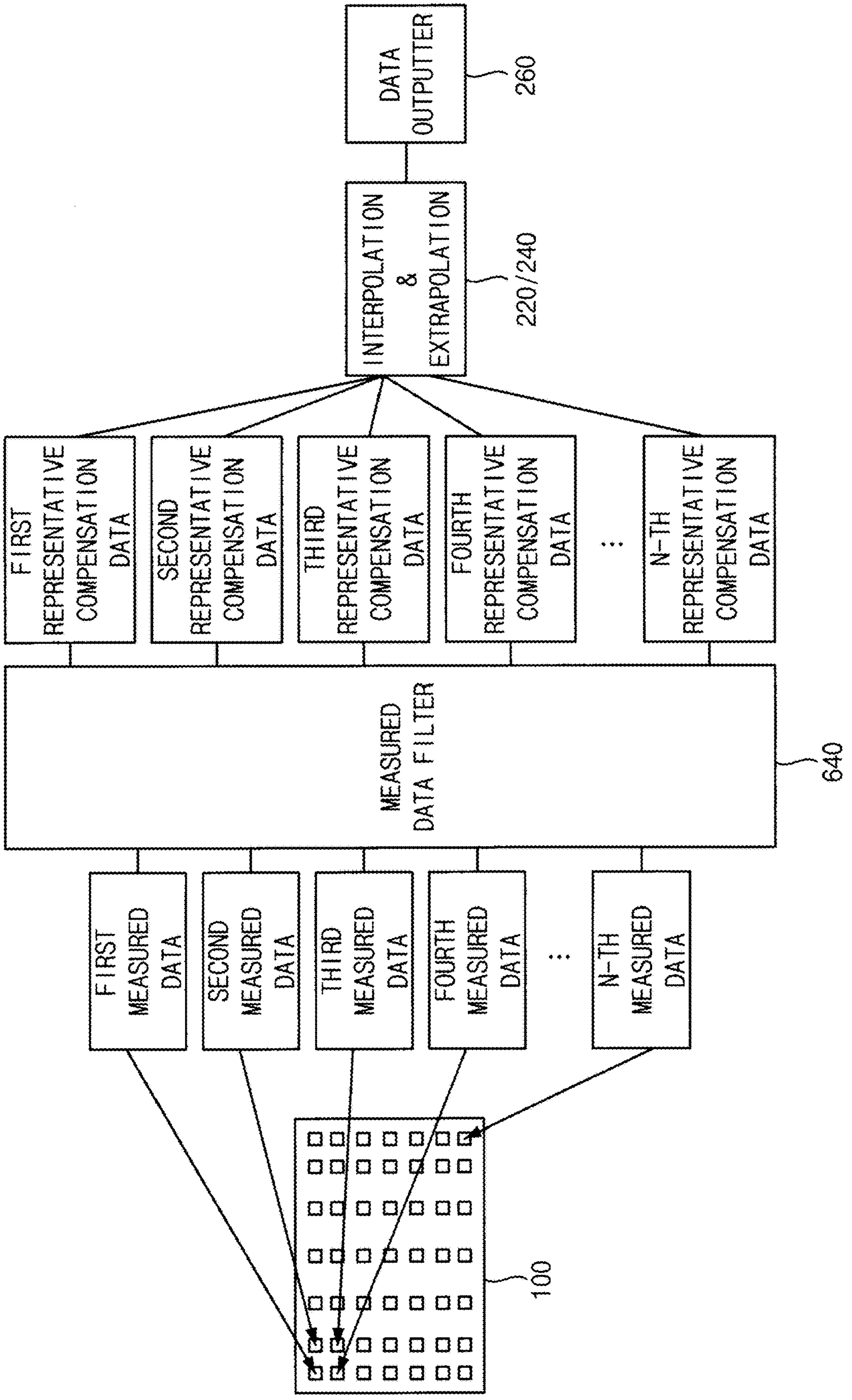
FIG. 2 is a block diagram illustrating an operation of the display system of FIG. 1.

FIG. 1 is a block diagram illustrating a display system according to an embodiment of the invention. FIG. 2 is a block diagram illustrating an operation of the display system of FIG. 1.

Referring to FIGS. 1 and 2, an embodiment of the display system may include a display apparatus and a measuring apparatus 600.

The display apparatus includes a display panel 100 for displaying an image. The measuring apparatus 600 may measure the image displayed on the display panel 100.

In one embodiment, for example, the measuring apparatus 600 may include a measurer (a measuring part) 620, a measured data filter 640 and a compensation data generator 660.

The measurer 620 may measure an image at a plurality of measuring points of the display panel 100 to generate a plurality of measured data. In an embodiment, as shown in FIG. 2, the measurer 620 may measure the image at first to N-th measuring points and generates first to N-th measured data. Here, N is a natural number.

The measurer 620 may measure an optical characteristic of the image. In one embodiment, for example, the measurer 620 may measure a luminance of the image. In such an embodiment, the measurer 620 may measure a chromaticity of the image.

The measured data filter 640 may remove a false measured data outside, e.g., exceeding, an allowable range among the measured data.

The compensation data generator 660 may generate a plurality of representative compensation data for compensating the image based on the measured data from which the false measured data is removed. The plurality of representative compensation data may include first to N-th representative compensation data corresponding to first to N-th measuring points, respectively. The first representative compensation data may be generated based on the first measured data. The second representative compensation data may be generated based on the second measured data. The third representative compensation data may be generated based on the third measured data. The fourth representative compensation data may be generated based on the fourth measured data. The N-th representative compensation data may be generated based on the N-th measured data. Non-uniformity of the optical characteristics (e.g. luminance and chromaticity) at the first to N-th measuring points may be compensated based on the first to N-th representative compensation data.

The display system may further include an interpolator 220, an extrapolator 240 and a data outputter 260.

The interpolator 220 may interpolate the representative compensation data corresponding to the measuring points of the display panel 100 to generate interpolation compensation data.

The extrapolator 240 may generate extrapolation compensation data corresponding to a display area outside an outermost measuring point based on outermost representative compensation data corresponding to the outermost measuring point.

The data outputter 260 may compensate input image data based on the representative compensation data, the interpolation compensation data and the extrapolation compensation data to generate a data signal.

The display apparatus of the display system may include a display panel 100 and a display panel driver for driving the display panel 100. The display panel driver may include a gate driver that outputs a gate signal to a gate line of the display panel 100, a data driver that outputs a data voltage to a data line of the display panel 100 and a driving controller 200 that controls the gate driver and the data driver.

The measuring apparatus 600 of the display system may measure the image displayed on the display panel 100.

In an embodiment, the measuring apparatus 600 may include the measurer 620, the measured data filter 640 and the compensation data generator 660. In such an embodiment, the driving controller 200 may include the interpolator 220, the extrapolator 240 and the data outputter 260.

The representative compensation data generated by the compensation data generator 660 may be written in a memory of the driving controller 200. The driving controller 200 may compensate the input image data using the representative compensation data stored in the memory.

Figure 3:
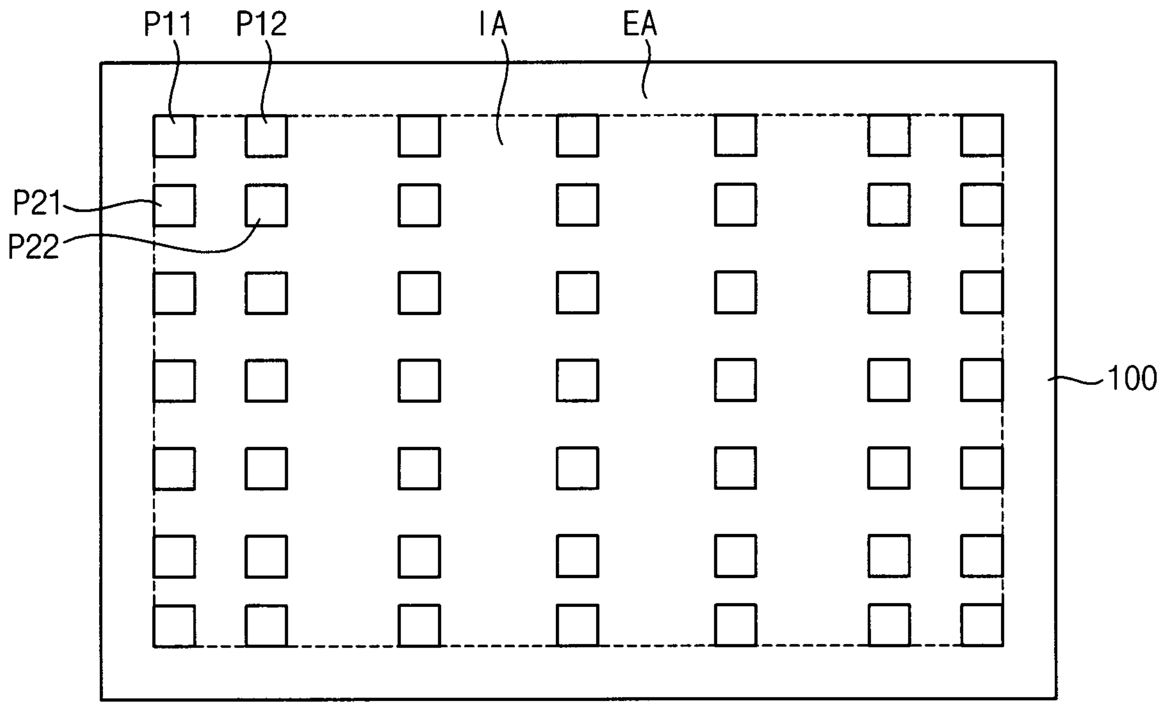
FIG. 3 is a conceptual diagram illustrating measuring points, an interpolation area and an extrapolation area of a display panel of FIG. 2.
Figure 4:
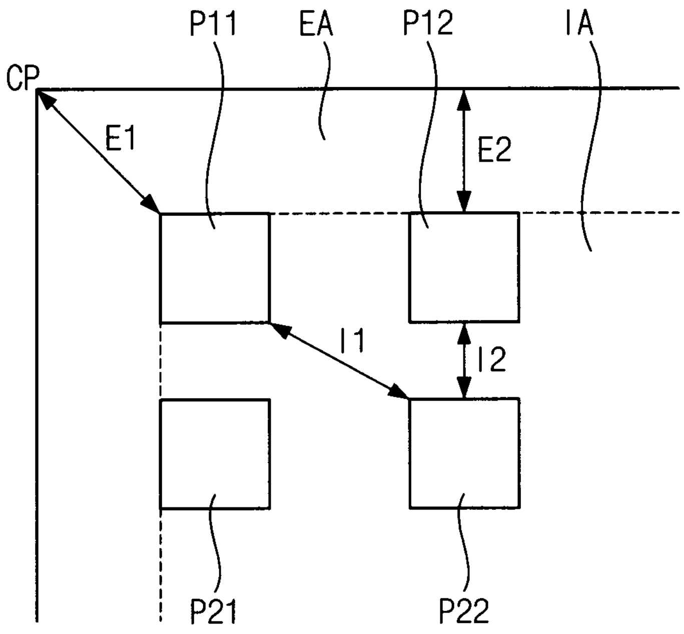
FIG. 4 is a conceptual diagram illustrating an operation of an interpolator of FIG. 1 and an operation of an extrapolator of FIG. 1.
Figure 5:
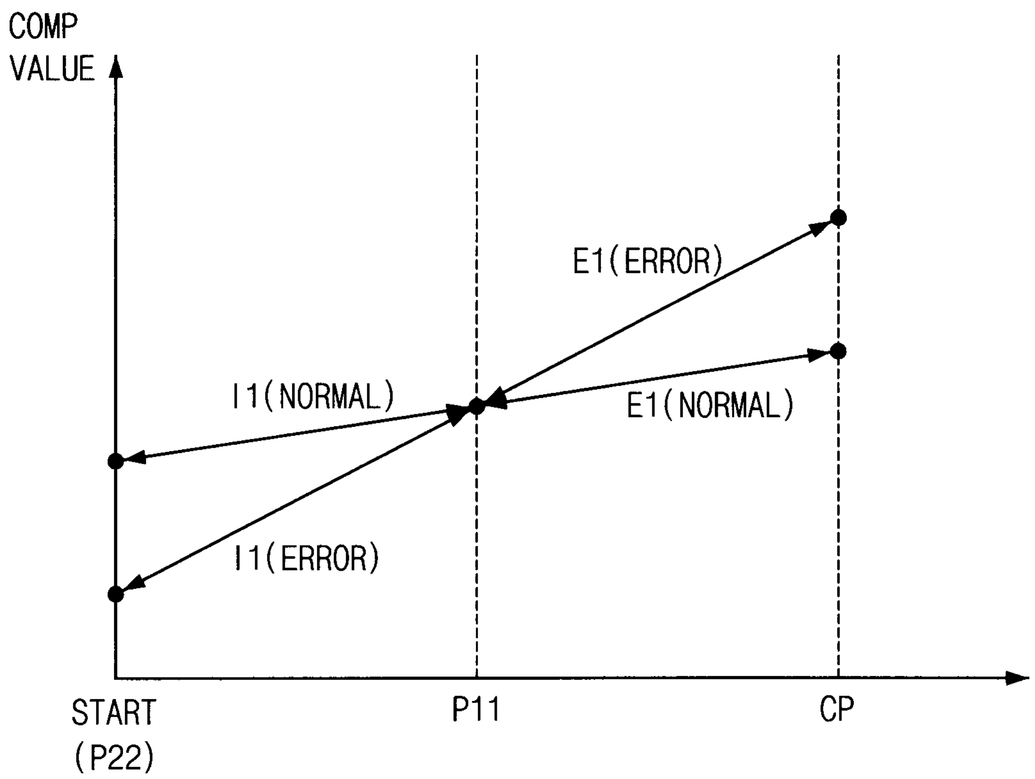
FIG. 5 is a conceptual diagram illustrating the operation of the interpolator of FIG. 1 and the operation of the extrapolator of FIG. 1 when the measured data is a normal data and when the measured data is a false data.

FIG. 3 is a conceptual diagram illustrating measuring points P11, P12, P21 and P22, an interpolation area IA and an extrapolation area EA of the display panel 100 of FIG. 2. FIG. 4 is a conceptual diagram illustrating an operation of the interpolator 220 of FIG. 1 and an operation of the extrapolator 240 of FIG. 1. FIG. 5 is a conceptual diagram illustrating the operation of the interpolator 220 of FIG. 1 and the operation of the extrapolator 240 of FIG. 1 when the measured data is a normal data and when the measured data is a false data.

Referring to FIGS. 1 to 5, the interpolation area IA may be defined as an area inside of the area defined by connecting outermost points of the outermost measuring points and the extrapolation area EA may be defined as an area outside of the area defined by connecting the outermost points of the outermost measuring points and an inside of a display area of the display panel 100.

For convenience of illustration and description, FIG. 3 show forty nine measuring points in seven rows and seven columns at the display panel 100, but the invention may not be limited to the number of the measuring points shown in FIG. 3.

The interpolator 220 may interpolate the representative compensation data corresponding to the measuring points of the display panel 100 between the measuring points in the interpolation area IA to generate interpolation compensation data.

As shown in FIG. 4, the interpolator 220 may interpolate the representative compensation data corresponding to the measuring points for the area I1 between the measuring point P11 in a first row and a first column and the measuring point P22 in a second row and a second column to generate the interpolation compensation data As shown in FIG. 4, the interpolator 220 may interpolate the representative compensation data corresponding to the measuring points for the area 12 between the measuring point P12 in the first row and the second column and the measuring point P22 in the second row and the second column to generate the interpolation compensation data.

The extrapolator 240 may generate extrapolation compensation data corresponding to the display area EA outside the outermost measuring point (e.g. P11 and P12) based on the outermost representative compensation data corresponding to the outermost measuring point. The extrapolator 240 may operate the extrapolation using an interpolation inclination of the interpolator 220.

As shown in FIG. 4, the extrapolation compensation data for the area E1 between the measuring point P11 in the first row and the first column and a first corner CP of the display area may be generated based on the representative compensation data corresponding to the measuring point P11 in the first row and the first column. Herein, the extrapolator 240 may operate the extrapolation for the area between the measuring point P11 in the first row and the first column and the first corner CP of the display area based on the interpolation result (I1 in FIG. 4) for the area between the measuring point P11 in the first row and the first column and the measuring point P22 in the second row and the second column.

As shown in FIG. 4, the extrapolation compensation data for the area E2 between the measuring point P12 in the first row and the second column and an upper edge of the display area may be generated based on the representative compensation data corresponding to the measuring point P12 in the first row and the second column. Herein, the extrapolator 240 may operate the extrapolation for the area between the measuring point P12 in the first row and the second column and the upper edge of the display area based on the interpolation result (12 in FIG. 4) for the area between the measuring point P12 in the first row and the second column and the measuring point P22 in the second row and the second column.

In an embodiment, as shown in FIG. 5, the interpolation I1 is operated from the measuring point P22 in the second row and the second column to the measuring point P11 in the first row and the first column and the extrapolation E1 is operated from the measuring point P11 in the first row and the first column to the first corner CP.

In an embodiment, when the measured data of the measuring point in the second row and the second column and the measured data of the measuring point in the first row and the first column are normally measured, the interpolation result I1(NORMAL) from the measuring point P22 in the second row and the second column to the measuring point P11 in the first row and the first column and the extrapolation result E1(NORMAL) from the measuring point P11 in the first row and the first column to the first corner CP may be proper.

In such an embodiment, when an error occurs at the measured data of the measuring point in the second row and the second column, an error may occur at the interpolation result I1(ERROR) from the measuring point P22 in the second row and the second column to the measuring point P11 in the first row and the first column and an error may occur at the extrapolation result E1(ERROR) from the measuring point P11 in the first row and the first column to the first corner CP.

Figure 6:
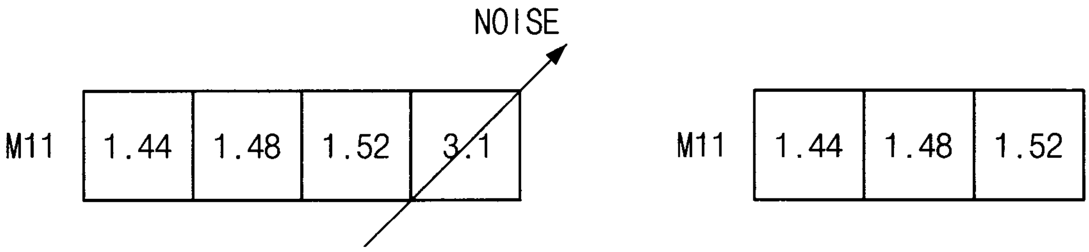
FIG. 6 is a conceptual diagram illustrating an embodiment of an operation of a measured data filter of FIG. 1.

FIG. 6 is a conceptual diagram illustrating an operation of the measured data filter 640 of FIG. 1.

Referring to FIGS. 1 to 6, in an embodiment, the measured data filter 640 may operate single measurer filtering which removes data outside, e.g., exceeding, a first allowable range from among first data measured multiple times by at least one unit measurer of the measurer 620 including a plurality of unit measurers. In one embodiment, for example, the measured data filter 640 may operate the single measurer filtering for all of the unit measurers of the measurer 620.

When a first average of the first data is denoted by m1, a first standard deviation of the first data is denoted by σ1, a predetermined first tolerance coefficient is denoted by t1 and the first data is denoted by x, the first allowable range of the first data may be set to $m1-t1*\sigma1<x<m1+t1*\sigma1$.

In one embodiment, for example, a first unit measurer M11 of the measurer 620 measures four times in FIG. 6. When the measured data of the first unit measurer M11 of four times are respectively 1.44, 1.48, 1.52 and 3.1, the first average m1 of the first data is 1.885, a first standard deviation σ1 of the first data is about 0.702. Herein, the first tolerance coefficient t1 may be properly set according to a target specification. When the first tolerance coefficient t1 is 1, the first allowable range of the first data x may be $1.183<x<2.587$.

Thus, the measured data filter 640 may determine that the first data of 3.1 which is outside or exceed the first allowable range as a noise and removes the first data of 3.1. In such an embodiment, a final measured data of the first unit measurer M11 may be 1.48 which is an average of 1.44, 1.48 and 1.52.

Figure 7:
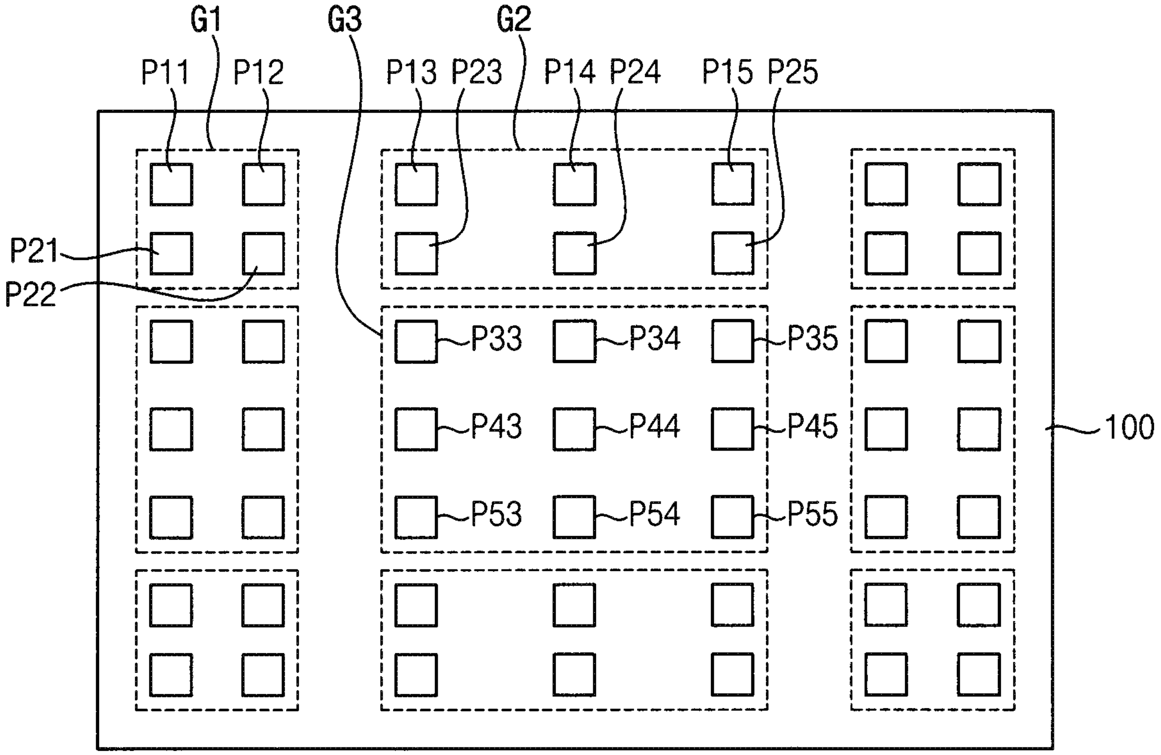
FIG. 7 is a conceptual diagram illustrating a group of measuring points of the display panel of FIG. 2.
Figure 8:
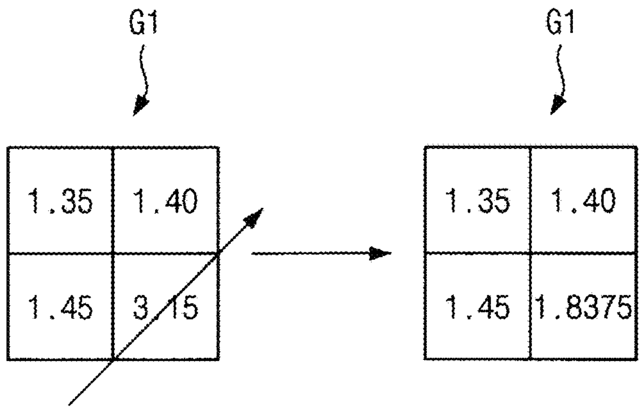
FIG. 8 is a conceptual diagram illustrating an embodiment of an operation of the measured data filter of FIG. 1.
Figure 9:
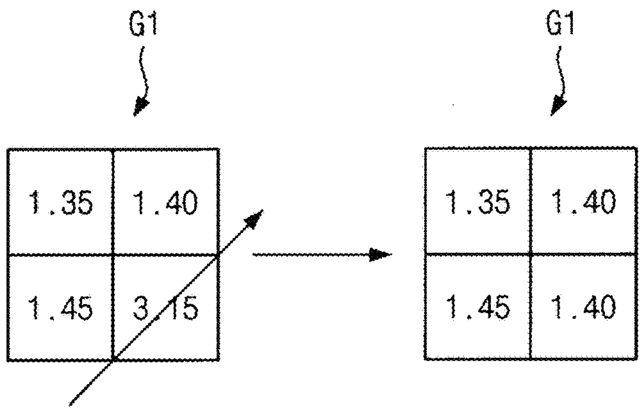
FIG. 9 is a conceptual diagram illustrating an embodiment of an operation of the measured data filter of FIG. 1.

FIG. 7 is a conceptual diagram illustrating a group of measuring points of the display panel 100 of FIG. 2. FIG. 8 is a conceptual diagram illustrating an operation of the measured data filter 640 of FIG. 1. FIG. 9 is a conceptual diagram illustrating an operation of the measured data filter 640 of FIG. 1.

Referring to FIGS. 1 to 9, in an embodiment, the measured data filter 640 may operate multi measuring point filtering which removes data outside, e.g., exceeding, a second allowable range among second data measured at adjacent measuring points in a group (e.g. G1, G2 and G3) of measuring points of the measurer 620 and replaces the removed data with replacement data. In one embodiment, for example, the measured data filter 640 may operate multiple unit measurer point filtering by including all of the measuring points in the measuring point group.

In one embodiment, for example, a size of a measuring point group (e.g. G2) in an edge portion of the display panel 100 may be smaller than a size of a measuring point group (e.g. G3) in a central portion of the display panel 100. In an embodiment, as shown in FIG. 7, the central measuring point group G3 may include nine measuring points P33, P34, P35, P43, P44, P45, P53, P54 and P55 and the edge measuring point group G2 may include six measuring points P13, P14, P15, P23, P24 and P25.

In such an embodiment, as shown in FIG. 5, the interpolation operation may be operated using both the measured data of a start point (which is inside a measuring area) and the measured data at an end point (which is inside the measuring area). However, in the extrapolation operation, a start point is inside the measuring area but an end point is outside the measuring area so that the start point of the extrapolation operation has the measured data but the end point of the extrapolation operation does not have the measured data. Accordingly, more accurate measurement may be desired at the edge portion G2 of the display panel 100 than at the central portion G3 of the display panel 100. Thus, the size of the measuring point group G2 in the edge portion of the display panel 100 may be set to be smaller than the size of the measuring point group G3 in the central portion of the display panel 100 so that the compensation resolution of the edge portion G2 of the display panel 100 may be greater than the compensation resolution of the central portion G3 of the display panel 100.

In one embodiment, for example, a size of a measuring point group (e.g. G1) in a corner portion of the display panel 100 may be further smaller than the size of the measuring point group (e.g. G2) in the edge portion of the display panel 100. In an embodiment, as shown in FIG. 7, the edge measuring point group G2 may include six measuring points P13, P14, P15, P23, P24 and P25 the corner measuring point group G1 may include four measuring points P11, P12, P21 and P22.

In an embodiment, as shown in FIG. 5, a length of the extrapolation compensation area at the corner area is longer than a length of the extrapolation compensation area at the edge area so that more accurate measurement may be desired at the corner portion G1 of the display panel 100 than at the edge portion G2 of the display panel 100. Thus, the size of the measuring point group G1 in the corner portion of the display panel 100 may be set to be smaller than the size of the measuring point group G2 in the edge portion of the display panel 100 so that the compensation resolution of the corner portion G1 of the display panel 100 may be greater than the compensation resolution of the edge portion G2 of the display panel 100.

FIG. 8 represents four measured data at four measuring points P11, P12, P21 and P22. In one embodiment, for example, the four measured data in FIG. 8 may be the data measured once at four measuring points P11, P12, P21 and P22.

When the measured data at the measuring points P11, P12, P21 and P22 are respectively 1.35, 1.40, 1.45 and 3.15, a second average m2 of the second data is 1.8375, a second standard deviation σ2 of the second data is about 0.759. Herein, a second tolerance coefficient t2 may be properly set according to a target specification. When the second tolerance coefficient t2 is 1, the second allowable range of the second data y may be $1.0785<y<2.5965$.

Thus, the measured data filter 640 may determine that the second data of 3.15 which exceed the second allowable range as a noise and removes the second data of 3.15. In such an embodiment, the removed data of the second row and the second row may be replaced with the second average 1.8375 of the four second data.

Alternatively, the replacement data may be the average of the second data not exceeding the second allowable range as shown in FIG. 9. In one embodiment, for example, the removed data of the second row and the second row may be replaced with the replacement data which is the average 1.40 of the three second data 1.35, 1.40 and 1.45.

Figure 10:
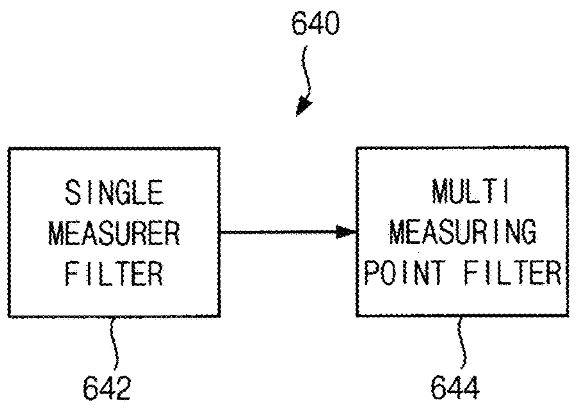
FIG. 10 is a conceptual diagram illustrating an embodiment of an operation of the measured data filter of FIG. 1.

FIG. 10 is a conceptual diagram illustrating an operation of the measured data filter 640 of FIG. 1.

Referring to FIGS. 1 to 10, in an embodiment, the measured data filter 640 may include a single measurer filter 642 and a multi measuring point filter 644. The single measurer filter 642 removes the data outside the first allowable range from among the first data measured multiple times by a first unit measurer of the measurer 620. The multi measuring point filter 644 removes the data outside the second allowable range among the second data measured at the adjacent measuring points in the group of the measuring points of the measurer 620 and replaces the removed data with the replacement data.

The operation of the single measurer filter 642 is substantially the same as that described above referring to FIG. 6. The operation of the multi measuring point filter 644 is substantially the same as that described above referring to FIGS. 7 to 9.

The measured data filter 640 may operate both the operation of the single measurer filter 642 and the operation of the multi measuring point filter 644. In such an embodiment, the measured data of the measuring point (e.g. P11, P12, P21 and P22) for the operation of the multi measuring point filter 644 may be the average data (e.g. 1.48 which is the average of 1.44, 1.48 and 1.52 in FIG. 6) which is obtained by measuring the image multiple times at each measuring point and removing the noise (e.g., 3.1 in FIG. 6) by the operation of the single measurer filter 642.

In such an embodiment, the first tolerance coefficient t1 may be set to be less than the second tolerance coefficient t2. The first tolerance coefficient t1 is for the measured data of a same unit measurer so that the first tolerance coefficient t1 may be set to be relatively little.

Figure 11:
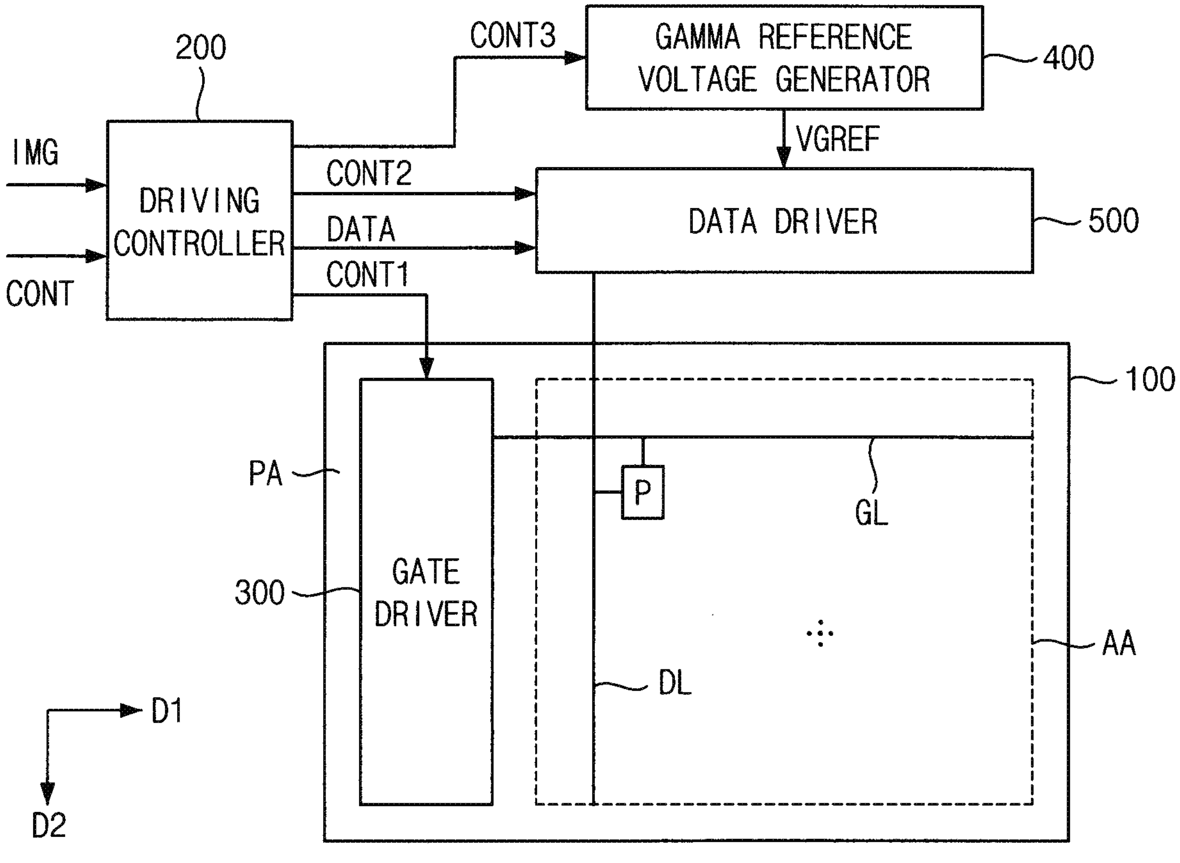
FIG. 11 is a block diagram illustrating an embodiment of a display apparatus of the display system of FIG. 1.

FIG. 11 is a block diagram illustrating an embodiment of a display apparatus of the display system of FIG. 1.

Referring to FIGS. 1 to 11, an embodiment of the display apparatus includes the display panel 100 and the display panel driver. The display panel driver includes the driving controller 200, the gate driver 300, a gamma reference voltage generator 400 and the data driver 500.

In one embodiment, for example, the driving controller 200 and the data driver 500 may be integrally formed with each other as one unit, e.g., one driving chip. In one embodiment, for example, the driving controller 200, the gamma reference voltage generator 400 and the data driver 500 may be integrally formed as a single unit, e.g., a single chip. A driving module including at least the driving controller 200 and the data driver 500 which are integrally formed with each other may be called to a timing controller embedded data driver ("TED").

The display panel 100 has a display region AA, on which an image is displayed, and a peripheral region PA adjacent to the display region AA.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may further include white image data. Alternatively, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals for driving the gate lines GL in response to the first control signal CONT1 received from the driving controller 200. The gate driver 300 outputs the gate signals to the gate lines GL. In one embodiment, for example, the gate driver 300 may sequentially output the gate signals to the gate lines GL.

In one embodiment, for example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages of an analog type using the gamma reference voltages VGREF. The data driver 500 outputs the data voltages to the data lines DL.

According to an embodiment, the data outside the first allowable range among data measured multiple times with the single unit measurer may be filtered so that the accuracy of the measured data may be enhanced and the accuracy of the image compensation may be enhanced. In an embodiment, the data outside the second allowable range among data of multiple adjacent measuring points may be replaced with the replacement data so that the accuracy of the measured data may be enhanced and the accuracy of the image compensation may be enhanced. Thus, in such an embodiment, the uniformity of the optical characteristic of the display panel 100 may be enhanced so that the display quality of the display panel 100 may be enhanced.

Figure 12:
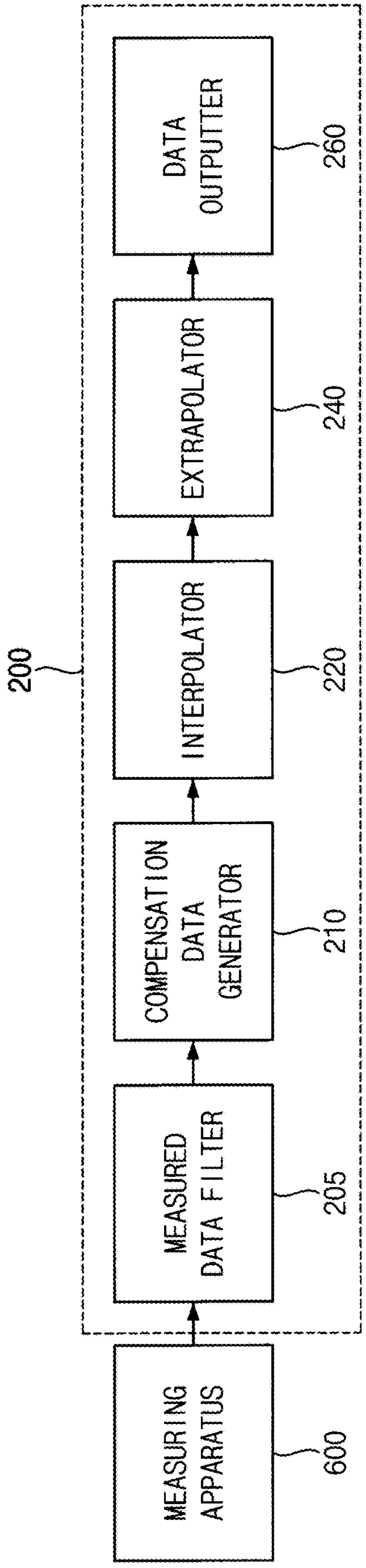
FIG. 12 is a block diagram illustrating a display system according to an embodiment of the invention.

FIG. 12 is a block diagram illustrating a display system according to an embodiment of the invention.

An embodiment of the display system shown in FIG. 12 is substantially the same as the embodiments of the display system described above referring to FIGS. 1 to 11 except for the structure of the measuring apparatus and the driving controller. Thus, the same reference numerals will be used to refer to the same or like elements as those of the embodiment of FIGS. 1 to 11, and any repetitive detailed description thereof will be omitted or simplified.

An embodiment of the display system includes a display apparatus and a measuring apparatus 600. The display apparatus includes a display panel 100 for displaying an image. The measuring apparatus 600 may measure the image displayed on the display panel 100.

In one embodiment, for example, the display system may include a measuring apparatus 600, a measured data filter 205 and a compensation data generator 210.

The display system may further include an interpolator 220, an extrapolator 240 and a data outputter 260.

In an embodiment, as shown in FIG. 12, the driving controller 200 may include the measured data filter 205, the compensation data generator 210, the interpolator 220, the extrapolator 250 and the data outputter 260.

According to an embodiment, the data outside the first allowable range among data measured multiple times with the single unit measurer may be filtered so that the accuracy of the measured data may be enhanced and the accuracy of the image compensation may be enhanced. In an embodiment, the data outside the second allowable range among data of multiple adjacent measuring points may be replaced with the replacement data so that the accuracy of the measured data may be enhanced and the accuracy of the image compensation may be enhanced. Thus, the uniformity of the optical characteristic of the display panel 100 may be enhanced so that the display quality of the display panel 100 may be enhanced.

According to embodiments of the invention, as described herein, the display system may filter the false measured data of the measurer to increase the accuracy of the measured data such that the accuracy of the image compensation is improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display system comprising:
- a measurer which measures an image at a measuring point of a display panel to generate measured data;
- a measured data filter which receives the measured data from the measurer, determines a false measured data, which is outside an allowable range, among the measured data as a noise, and removes the false measured data from the measured data; and
- a compensation data generator which generates representative compensation data for compensating the image based on the measured data in which the false measured data is removed,
- wherein the measured data filter removes a data outside a second allowable range among second data measured at adjacent measuring points in a measuring point group of the measurer and replaces the removed data with replacement data.

2. The display system of claim 1, further comprising:
- an interpolator which interpolates the representative compensation data corresponding to the measuring point of the display panel to generate an interpolation compensation data.

3. The display system of claim 2, further comprising:
- an extrapolator which generates an extrapolation compensation data corresponding to a display area outside an outermost measuring point based on an outermost representative compensation data corresponding to the outermost measuring point.

4. The display system of claim 3, further comprising:
- a data outputter which compensates input image data based on the representative compensation data, the interpolation compensation data and the extrapolation compensation data to generate a data signal.

5. The display system of claim 4, further comprising:
- a driving controller which generates the data signal based on the input image data;
- a gate driver which outputs a gate signal to a gate line of the display panel; and
- a data driver which outputs a data voltage to a data line of the display panel based on the data signal,
- wherein the driving controller comprises the interpolator, the extrapolator and the data outputter.

6. The display system of claim 4, further comprising:
- a driving controller which generates the data signal based on the input image data;
- a gate driver which outputs a gate signal to a gate line of the display panel; and
- a data driver which outputs a data voltage to a data line of the display panel based on the data signal,
- wherein the driving controller comprises the measured data filter, the compensation data generator, the interpolator, the extrapolator and the data outputter.

7. The display system of claim 1, wherein the measured data filter removes a data outside a first allowable range among first data measured multiple times by a first unit measurer of the measurer.

8. The display system of claim 7, wherein when an average of the first data is denoted by m1, a first standard deviation of the first data is denoted by σ1, a predetermined first tolerance coefficient is denoted by t1 and the first data is denoted by x, the first allowable range of the first data corresponds to the following inequality: $m1-t1*\sigma1<x<m1+t1*\sigma1$.

9. The display system of claim 1, wherein when an average of the second data is denoted by m2, a second standard deviation of the second data is denoted by σ2, a predetermined second tolerance coefficient is denoted by t2 and the second data is denoted by y, the second allowable range of the second data corresponds to the following inequality: $m2-t2*\sigma2<y<m2+t2*\sigma2$.

10. The display system of claim 1, wherein the replacement data is the average of the second data.

11. The display system of claim 1, wherein the replacement data is an average of values of the second data in the second allowable range.

12. The display system of claim 1, wherein a size of the measuring point group in an edge portion of the display panel is smaller than a size of the measuring point group in a central portion of the display panel.

13. The display system of claim 12, wherein a size of the measuring point group in a corner portion of the display panel is smaller than the size of the measuring point group in the edge portion of the display panel.

14. A display system comprising:
- a measurer which measures an image at a measuring point o a display panel to generate measured data;
- a measured data filter which removes a false measured data exceeding an allowable range among the measured data; and
- a compensation data generator which generates representative compensation data compensating the image based on the measured data in which the false measured data is removed,
- wherein the measured data filter comprises:
- a single measurer filter which removes a data outside a first allowable range among first data measured multiple times by a first unit measurer of the measurer; and
- a multi measuring point filter which replaces data outside a second allowable range among second data measured at adjacent measuring points in a measuring point group of the measurer with replacement data.

15. The display system of claim 14, wherein when an average of the first data is denoted by m1, a first standard deviation of the first data is denoted by σ1, a predetermined first tolerance coefficient is denoted by t1 and the first data is denoted by x, the first allowable range of the first data corresponds to the following inequality: $m1-t1*\sigma1<x<m1+t1*\sigma1$, and
- wherein when a second average of the second data is denoted by m2, a second standard deviation of the second data is denoted by σ2, a predetermined second tolerance coefficient is denoted by t2 and the second data is denoted by y, the second allowable range of the second data corresponds to the following inequality: $m2-t2*\sigma2<y<m2+t2*\sigma2$.

16. The display system of claim 15, wherein the first tolerance coefficient is less than the second tolerance coefficient.

17. A method of compensating an image of a display panel, the method comprising:

measuring an image at a measuring point of the display panel to generate measured data;

determining, as a noise, a false measured data, which is outside an allowable range, among the measured data generated by measuring the image at the measuring point of the display panel, and removing the false measured data from the measured data;

generating representative compensation data for compensating the image based on the measured data in which the false measured data is removed;

interpolating the representative compensation data corresponding to the measuring point of the display panel to generate an interpolation compensation data; and generating an extrapolation compensation data corresponding to a display area outside an outermost measuring point based on an outermost representative compensation data corresponding to the outermost measuring point, wherein the removing the false measured data comprises:

removing a data outside a second allowable range among second data measured at adjacent measuring points in a measuring point group of a measurer; and replacing the removed data with replacement data.

18. The method of claim 17, wherein the removing the false measured data comprises removing a data outside a first allowable range among first data measured multiple times by a first unit measurer.

* * * * *